(12) United States Patent
Staton

(10) Patent No.: US 7,213,508 B2
(45) Date of Patent: May 8, 2007

(54) MOLDED EGG-SHAPED FOOD PRODUCT, AND METHOD AND MOLD FOR MAKING SAME

(76) Inventor: Clarence Staton, 4203 Craven Hill Rd., Charlotte, NC (US) 28216

( * ) Notice: Subject to any disclaimer, the term of this patent is extended or adjusted under 35 U.S.C. 154(b) by 499 days.

(21) Appl. No.: 10/304,408

(22) Filed: Nov. 26, 2002

(65) Prior Publication Data

US 2004/0099150 A1    May 27, 2004

(51) Int. Cl.
*A23P 1/10* (2006.01)
(52) U.S. Cl. ............................. 99/353; 99/440; 99/447; 99/448; 425/233; 425/346; 425/588; 425/589; 425/595; 425/DIG. 243
(58) Field of Classification Search ................. 99/426, 99/440, 353, 447, 448; 426/512, 515; 425/233–234, 425/346, 547, DIG. 243, 246, 595, 588–589
See application file for complete search history.

(56) References Cited

U.S. PATENT DOCUMENTS

| | | | | |
|---|---|---|---|---|
| 211,859 A | * | 2/1879 | Manley | ....................... 249/108 |
| 534,633 A | * | 2/1895 | Coleman | ..................... 249/127 |
| 3,161,156 A | * | 12/1964 | Batista et al. | ................ 249/120 |
| 3,871,811 A | * | 3/1975 | Barry et al. | ................. 425/407 |
| 4,395,222 A | * | 7/1983 | Gaiser et al. | ............... 425/548 |
| 4,790,740 A | * | 12/1988 | Pearlman | ..................... 425/396 |
| 4,862,790 A | * | 9/1989 | Platteschorre et al. | ......... 99/353 |
| 5,662,027 A | * | 9/1997 | Neville et al. | ................ 99/415 |
| 5,795,529 A | * | 8/1998 | Reid, Jr. | ...................... 264/293 |
| 6,235,325 B1 | * | 5/2001 | Greitzer | ...................... 426/123 |

* cited by examiner

*Primary Examiner*—Drew Becker
(74) *Attorney, Agent, or Firm*—Adams Evans P.A.

(57) ABSTRACT

A mold for making an egg-shaped food product includes top and bottom mold halves which cooperate when joined to form an egg-shaped interior mold cavity adapted for receiving a liquid foodstuff. The top and bottom mold halves define a plurality of thermal transit holes passing in registration through the top and bottom mold halves. The thermal transit holes are located adjacent to the interior mold cavity for promoting movement of heat between the interior mold cavity and an environment within which the mold is placed. An injection port is formed in one of the top and bottom mold halves, and communicates with the interior mold cavity for introducing the liquid foodstuff into the interior mold cavity. A fastener joins the top and bottom mold halves together to seal the interior mold cavity.

15 Claims, 2 Drawing Sheets

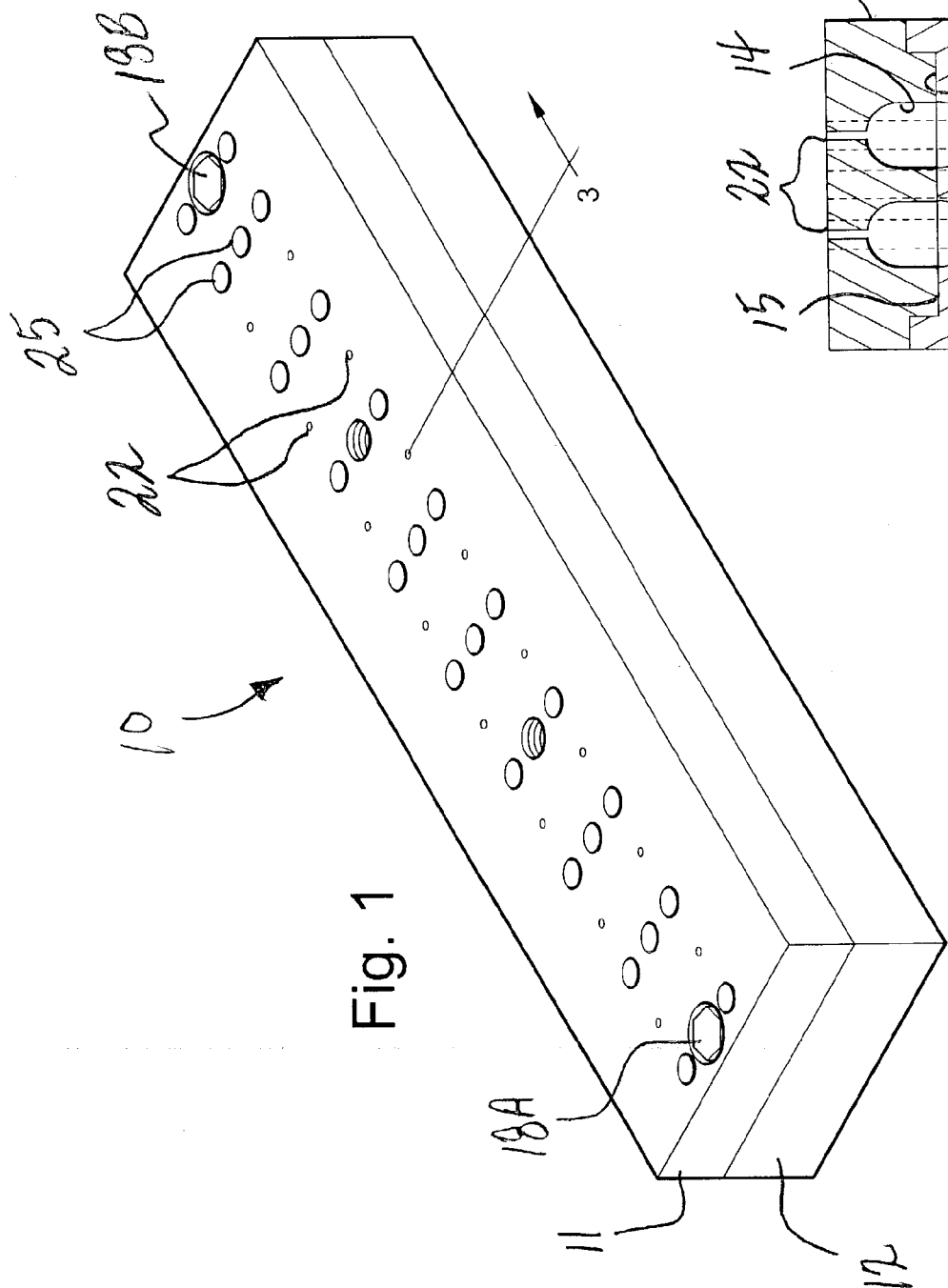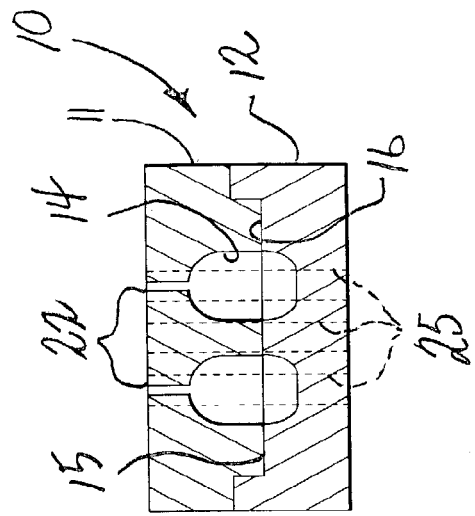

MOLDED EGG-SHAPED FOOD PRODUCT, AND METHOD AND MOLD FOR MAKING SAME

TECHNICAL FIELD AND BACKGROUND OF INVENTION

This application relates to a molded egg-shaped food product, and a method and mold for making an egg-shaped food product. The invention is made of a liquid foodstuff, such as raw egg white or yoke, which is intended to closely resemble a hard-boiled whole egg in miniature form when cooked. Unlike whole eggs, the present egg product is formed in a convenient size suited for marinading in standard-size bottles of salad dressing, or being placed on salads. The egg product is quick and easy to cook, and offers a convenient alternative for those who wish to use less than an entire hard-boiled egg either by itself or as an adornment.

SUMMARY OF INVENTION

Therefore, it is an object of the invention to provide a molded egg-shaped food product which closely resembles a hard-boiled whole egg in miniature form.

It is another object of the invention to provide a mold for quickly and conveniently making a number of miniature egg-shaped food products in a single batch.

It is another object of the invention to provide a method for making a miniature egg-shaped food product.

These and other objects of the present invention are achieved in the preferred embodiments disclosed below by providing a mold for making an egg-shaped food product. The mold includes top and bottom mold halves which cooperate when joined to form an egg-shaped interior mold cavity adapted for receiving a liquid foodstuff. The top and bottom mold halves define a plurality of thermal transit holes passing in registration through the top and bottom mold halves. The thermal transit holes are located adjacent to the interior mold cavity for promoting movement of heat between the interior mold cavity and an environment within which the mold is placed. An injection port is formed in one of the top and bottom mold halves, and communicates with the interior mold cavity for introducing the liquid foodstuff into the interior mold cavity. Means are provided for joining the top and bottom mold halves to seal the interior mold cavity.

According to another preferred embodiment of the invention, the top and bottom mold halves define a plurality of egg-shaped interior mold cavities when joined.

According to another preferred embodiment of the invention, the plurality of interior mold cavities are arranged in spaced-apart rows extending from one end of the mold to the other.

According to another preferred embodiment of the invention, the thermal transit holes are arranged in columns spaced apart from one end of the mold to the other. The columns extend respectively between each of the interior mold cavities.

According to another preferred embodiment of the invention, the thermal transit holes are formed on each side of the interior mold cavity.

According to another preferred embodiment of the invention, the means for joining the top and bottom mold halves comprises a threaded fastener.

According to another preferred embodiment of the invention, the top and bottom mold halves are constructed of a thermally conductive material.

In another embodiment, the invention is a method for making an egg-shaped food product. The method includes the step of introducing a liquid foodstuff into an egg-shaped interior mold cavity defined by mating halves of a mold. The mold is then submersed in water at a temperature in excess of 200 degrees Fahrenheit to cook and solidify the foodstuff contained in the interior mold cavity. After heating, the mold is then submersed in water at a temperature of less than 80 degrees Fahrenheit to cool the solidified foodstuff. After cooling, the egg-shaped, solidified foodstuff is removed from the mold cavity for consumption.

According to another preferred embodiment of the invention, the step of introducing the liquid foodstuff includes injecting the foodstuff through an injection port formed in the mold and communicating with the interior mold cavity.

According to another preferred embodiment of the invention, the step of submersing the mold in water to cook and solidify the foodstuff includes submersing the mold for between 15 and 20 minutes.

According to another preferred embodiment of the invention, the step of submersing the mold in water to cool the foodstuff includes submersing the mold for between 30 seconds and 1 minute.

According to another preferred embodiment of the invention, the liquid foodstuff is raw egg white.

According to another preferred embodiment of the invention, the liquid foodstuff is raw egg yoke.

According to another preferred embodiment of the invention, the method includes injecting a food coloring agent into a center of the interior mold cavity after introducing the foodstuff into the mold cavity.

In yet another embodiment, the invention is a molded egg-shaped food product.

BRIEF DESCRIPTION OF THE DRAWINGS

Some of the objects of the invention have been set forth above. Other objects and advantages of the invention will appear as the description proceeds when taken in conjunction with the following drawings, in which:

FIG. 1 is an assembled, perspective view of a mold for making an egg-shaped food product according to one preferred embodiment of the invention;

FIG. 3 is a cross-sectional view of the mold taken substantially along line 3—3 of FIG. 1.

DESCRIPTION OF THE PREFERRED EMBODIMENT AND BEST MODE

Figure 2:
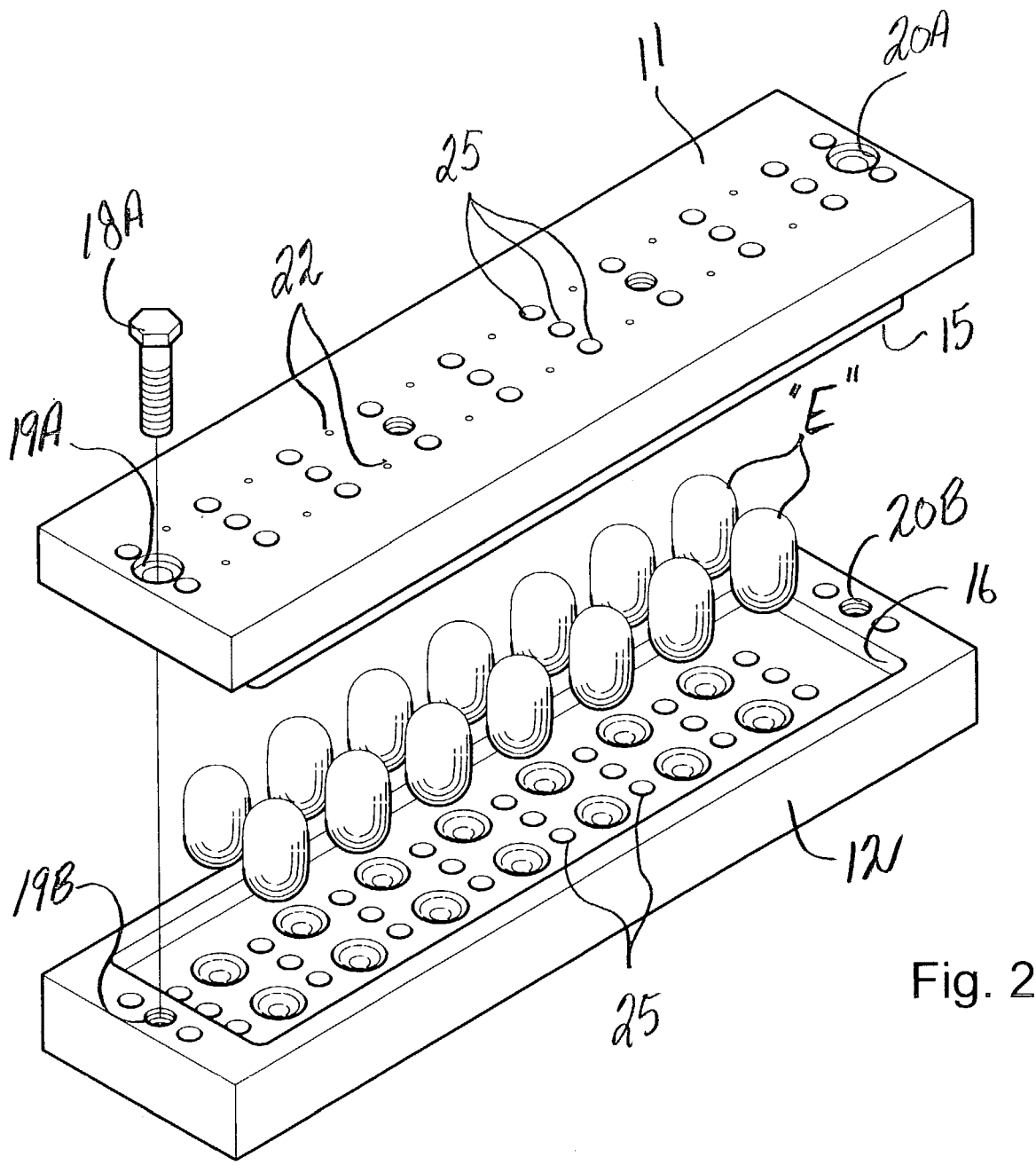
FIG. 2 is an exploded, perspective view of the mold showing the mold halves separated and spaced-apart, and the molded food products removed from their respective mold cavities.

Referring now specifically to the drawings, a mold for making an egg-shaped food product according to the present invention is illustrated in FIGS. 1–3, and shown generally at reference numeral 10. The mold 10 is constructed of solid top and bottom mating halves 11 and 12 which cooperate when joined to form a number of egg-shaped, interior mold cavities 14 (FIG. 3). The mold halves 11 and 12 are preferably formed of a highly conductive material, such as metal. As shown in FIGS. 2 and 3, the top mold half 11 has a raised surface 15 which fits into a complementary recessed surface 16 formed with the bottom mold half 12 to ensure exact alignment of the mold halves 11, 12 and proper sealed formation of the interior mold cavities 14. The mold halves 11, 12 are preferably joined together by threaded bolts 18A, 18B received through complementary-threaded and axially aligned openings 19A, 19B and 20A, 20B formed in each of the mold halves 11, 12. Alternatively, the mold halves 11, 12 are joined together by other suitable means, such as releasable clamps, banding straps, tape, or the like. For increased bonding, additional threaded bolts (not shown) may be passed through intermediate threaded openings in the mold halves 11, 12.

Injection ports 22 are formed through the top mold half 11 and communicate, respectively, with the interior mold cavities 14 for allowing introduction of a liquid foodstuff into the mold cavities 14 for cooking. The threaded bolts 18A, 18B maintain a sufficiently tight seal between the mold halves 11, 12 to prevent any leakage of foodstuff outside the mold cavities 14. In one application, the liquid foodstuff is raw egg white or yoke inserted through the injection ports 22 using a conventional cooking syringe. The interior mold cavities 14 are preferably arranged in two spaced-apart rows which extend from one end of the mold 10 to the other. Columns of three thermal transit holes 25 are formed between each laterally-adjacent pair of mold cavities 14. The thermal transit holes 25 extend entirely through the mold 10, and operate to promote movement of heat between the interior mold cavities 14 and an environment within which the mold 10 is placed. According to one embodiment, the diameter of each thermal transit hole 25 is approximately 0.2 inches, the diameter of the interior mold cavity 14 is approximately 0.5 inches, and the height of the interior mold cavity 14 is approximately 0.7 inches. The columns of thermal transit holes 25 are spaced about 1.0 inches apart (on center). The interior mold cavities 14 are spaced about 1.0 inches apart (on center) along a lengthwise dimension of the mold 10, and about 0.8 apart (on center) along a widthwise dimension of the mold 10.

After injecting the raw egg white or yoke into the mold cavities 14, as previously described, the assembled mold 10 is submersed in a tub of hot water for approximately 15 to 20 minutes. The water is maintained at a temperature of greater than 200 degrees Fahrenheit, and is preferably boiling. Energy from the hot water passes through the thermal transit holes 25 to the interior mold cavities 14 as the raw egg white or yoke begins to cook and solidify inside the mold 10. After heating, the mold 10 is removed from the hot water tub and immediately placed in a tub of cooler water for approximately 30 seconds to one minute. The temperature of the cool water is less than 80 degrees Fahrenheit, and preferably less than 60 degrees Fahrenheit. During cooling, heat from the mold 10 passes outside the interior mold cavities 14 through the thermal transit holes 25. After cooling, the threaded bolts 18A, 18B are removed and the mold halves 11, 12 separated to expose the resulting molded egg products "E". The egg products "E" are especially appetizing when used in salad dressings, salads, or by themselves.

In an alternative application, a food coloring agent may be inserted into the mold cavities 14 prior to cooking the liquid foodstuff. For example, in order to more closely replicate an actual egg, after injecting the raw egg white, a yellow food color is injected in a center portion of the mold cavity 14. The yellow center portion of the resulting egg product resembles the yoke of an actual egg.

A mold for making an egg-shaped food product is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A mold for making an egg-shaped food product, said mold comprising:
    (a) first and second mold segments cooperating when joined to form a plurality of interior mold cavities adapted for receiving a liquid foodstuff;
    (b) said first and second mold segments defining a plurality of thermal transit holes passing in registration through said first and second mold segments, and located adjacent to said interior mold cavities for promoting movement of heat between said interior mold cavities and an environment within which said mold is placed;
    (c) an injection port formed in one of said first and second mold segments, and communicating with said interior mold cavity for introducing the liquid foodstuff into said interior mold cavities;
    (d) means for joining the first and second mold segments to seal said interior mold cavity; and
    (e) wherein the first mold segment includes an inner portion having a surface raised in relation to an outer portion and extending in a perimeter surrounding the plurality of cavities, and the second mold segment includes an inner portion having a surface recessed in relation to an outer portion and extending in a perimeter surrounding the plurality of cavities for receiving the raised inner surface of the first segment in complementary engagement whereby the raised surface of the first mold segment and the recessed surface of the second mold segment cooperate to facilitate proper alignment of the first and second mold segments and to form a single continuous perimeter of complementary engagement surrounding the plurality of cavities for preventing leakage of the liquid foodstuff from the plurality of cavities.

2. A mold according to claim 1, wherein said first and second mold segments define a plurality of egg-shaped interior mold cavities when joined.

3. A mold according to claim 2, wherein said plurality of interior mold cavities are arranged in spaced-apart rows extending from one end of said mold to the other.

4. A mold according to claim 2, wherein said thermal transit holes are arranged in columns spaced apart from one end of the mold to the other, and extending respectively between each of said interior mold cavities.

5. A mold according to claim 1, wherein said thermal transit holes are formed on each side of said interior mold cavities.

6. A mold according to claim 1, wherein said means for joining the first and second mold segments comprises a threaded fastener.

7. A mold according to claim 1, wherein said first and second mold segments are constructed of a thermally conductive material.

8. A mold according to claim 1, wherein the first mold segment is positioned on top of the second mold segment when the first and second mold segments are joined.

9. A mold according to claim 1, wherein the first and second mold segments define a plurality of vertically oriented egg-shaped interior mold cavities when joined.

10. A mold according to claim 1, wherein the mold cavities and the thermal transit holes are vertically oriented.

11. A mold according to claim 10, wherein the injection port is vertically oriented.

12. A mold according to claim 1, wherein the injection port is adapted for receiving a syringe.

13. A mold according to claim 1, wherein the mold includes a substantially flat top surface, wherein the thermal transit holes are formed in the top surface.

14. A mold according to claim 1, wherein the mold includes a substantially flat top surface, and wherein the injection port is formed in the top surface.

15. A mold according to claim 1, further comprising a syringe for introducing the liquid foodstuff into the injection port, and wherein the injection port is sized for receiving the syringe.

* * * * *